Nov. 25, 1924.
C. L. ALLEN ET AL
1,516,875
SWIVEL HOOK
Filed March 13, 1924
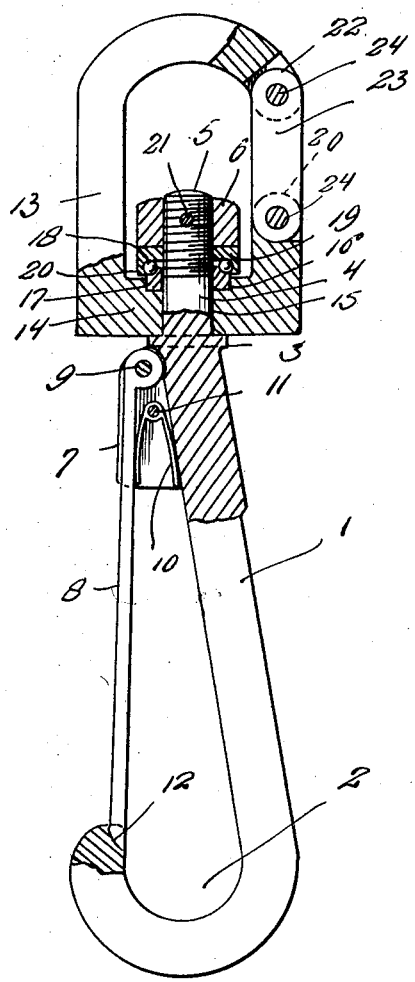
C. L. Allen,
A. A. Allen,
Inventors
By Clarence A. O'Brien
Attorney Patented Nov. 25, 1924.

1,516,875

UNITED STATES PATENT OFFICE.

CLIFFORD L. ALLEN AND ARTHUR A. ALLEN, OF BURKBURNETT, TEXAS.

SWIVEL HOOK.

Application filed March 13, 1924. Serial No. 699,012.

*To all whom it may concern:*

Be it known that we, CLIFFORD L. ALLEN and ARTHUR A. ALLEN, citizens of the United States, residing at Burkburnett, in the county of Wichita and State of Texas, have invented certain new and useful Improvements in Swivel Hooks, of which the following is a specification.

This invention relates to improvements in swivel hooks.

An object of the invention resides in providing a swivel hook having an eye member provided with a hinged link section adapted to be rigidly connected with the main portion of the leg, for effectively locking the end of the chain in the link, and yet permitting the ready removal of the same therefrom.

Another object of the invention resides in providing a hook having a projecting stud for receiving an eye member adapted to be secured in swivelled relation therewith, the securing means for holding the hook in the eye member in assembled relation, also having the thrust bearing between the hook and eye members for securing a predetermined movement of the hook relative to the eye, and of a construction adapted to eliminate foreign matter from the bearing element.

Another object of the invention resides in providing a swivel member, having an eye member swivelled on an extension on the hook and provided with a bearing, so that the eye is freely rotatable on the hook, and also providing a special hook structure, with which is associated a pivoted latching finger mounted between parallel flanges formed at the end of the hook adjacent the shank thereof.

The invention also comprehends other objects and improvements in the construction and arrangement of parts, which is more particularly pointed out in the following description and claim directed to the preferred form of the invention, it being understood that variations in the specific construction and arrangement of the parts may be made within the scope of the description and claim.

In the drawing, forming a part of the application:

The figure is a side elevation of the swivel hook, portions being broken away and shown in section.

A hook member is indicated at 1, provided at one end with a hook 2, and at the opposite end with an annular flange 3, from which extends a shank portion 4, threaded at the outer end as indicated at 5, for the reception of a nut 6. Adjacent the flange 3, the body of the hook is formed with a pair of parallel flanges 7, extending from opposite sides in spaced relation, for receiving the rigid latching member 8, pivotally connected between the parallel flanges adjacent the flange 3, as indicated at 9, by a pin extending through the enlarged end of the latch 8, and openings formed in the parallel flanges 7. A suitable U-shaped spring member 10, is mounted intermediate its ends on a pin 11, carried by the parallel flanges 7, as clearly shown in the drawings, the ends of said spring member engaging the latch 8 and the body of the hook 1, for normally forcing the free end of the latch into engagement and seating cooperation with the recess 12, in the ends of the hooks 2, as clearly shown in the figure of the drawing.

A swivel eye is indicated generally at 13, and has a substantially flat base portion 14, provided with a central bore 15, for receiving the shank 4 of the hook, the inner end of the bore being enlarged into an annular recess 16, for the reception of a bearing member 17, formed with a ball groove in the upper edge for receiving ball bearings 18. A cooperating bearing member is indicated at 19, having a ball groove therein for forming a raceway for the ball bearings 18, and provided with a projecting flange 20, adapted to extend over the periphery of the bearing member 17, and to a point in substantial contact with the base portion 14 of the eye member, in order to exclude dirt or other foreign matter from the ball bearings 18 and the ball race way formed in said bearing member. As will be clearly observed from the drawing, the nut 6, when screwed onto the threaded end of the shank 4, assembles the hook 1 with the eye member 13, and holds said bearing members and balls in proper bearing relation. The end of the shank is formed with a transverse opening for the reception of a cotter pin, as indicated at 21 or the like, for locking the nut against further turning movement after the hook and eye members and the bearing members are in proper assembled relation.

One side of the eye member is cut away and formed with a pair of ears 22, at each end of the cut away portion arranged in spaced relation for receiving a link 23 adapted to be secured to the eye member by suitable pins 24, which are readily removable for permitting the opening of the eye member in order to insert or remove the link of a chain therefrom, when it is desired to attach or remove the swivel hook for obvious purposes from the connection parts.

From the above description, it will therefore be clear that a simple and convenient form of swivel hook has been provided, wherein a simple form of bearing member mounts the parts so that they are easily rotatable, with respect to one another, providing a protected bearing member, and means in cooperation with the hooked end link for preventing the disengagement of a chain from an eye member or the hook.

What is claimed is:

A swivel hook comprising a suspension hook provided with a retaining latch, an eye having swivel connection with the upper end of the shank of said hook, said eye being open on one side and one of the ends thereof being bifurcated, while the other end is recessed, a retaining link having one end pivoted between the furcations and having its opposite end receivable in said recess, and a removable retaining pin for the last named end of the link.

In testimony whereof we affix our signatures.

CLIFFORD L. ALLEN.
ARTHUR A. ALLEN.